Aug. 9, 1949.   H. PEARCE   2,478,545
OPHTHALMIC CAMERA WITH ADJUSTABLE LIGHT SUPPORT
Filed Nov. 8, 1945
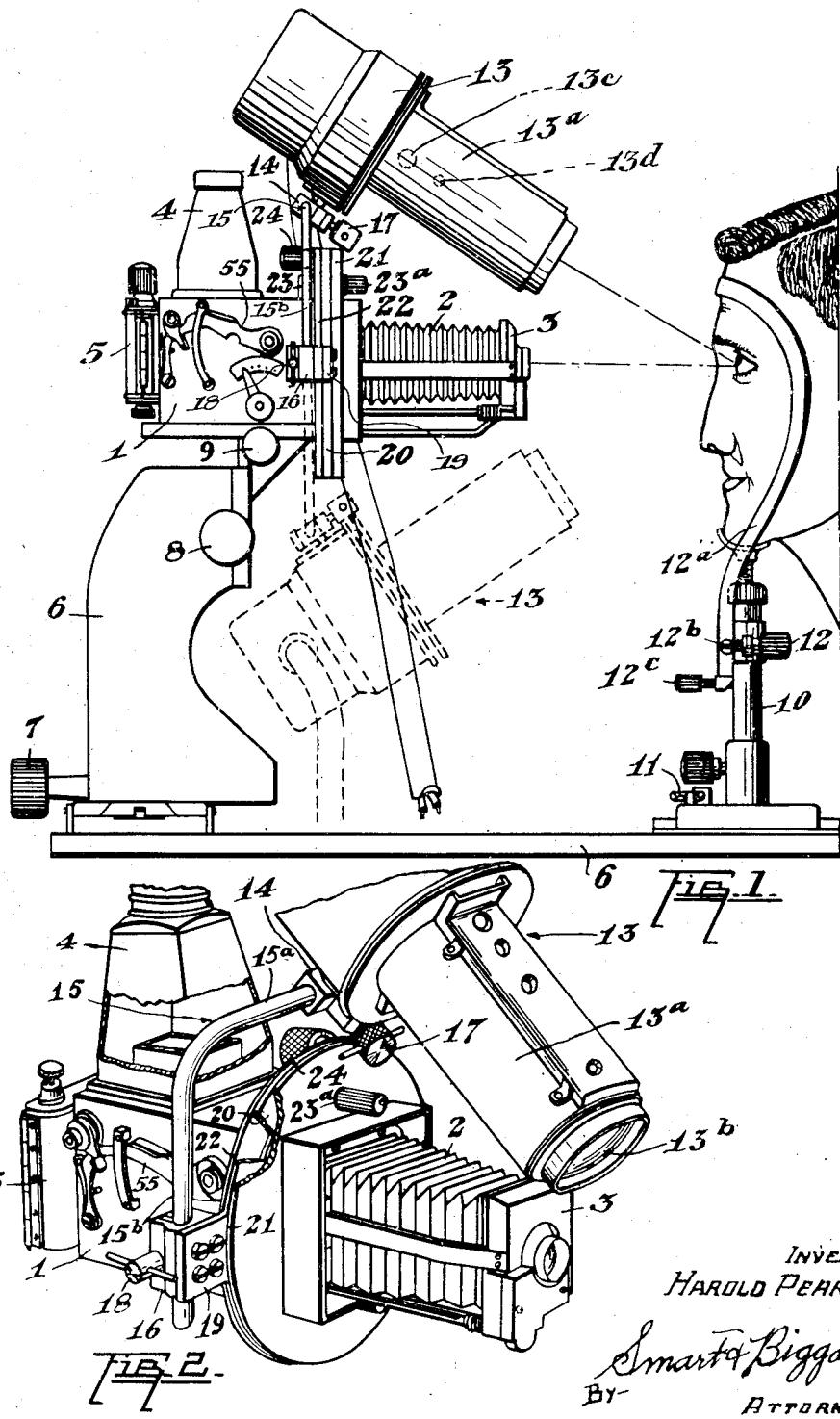
INVENTOR
HAROLD PEARCE
BY Smart & Biggar
ATTORNEYS Patented Aug. 9, 1949

2,478,545

UNITED STATES PATENT OFFICE 2,478,545

OPHTHALMIC CAMERA WITH ADJUSTABLE LIGHT SUPPORT

Harold Pearce, Ottawa, Ontario, Canada, assignor to The Honorary Advisory Council for Scientific and Industrial Research, Ottawa, Ontario, Canada, a corporation of Canada Application November 8, 1945, Serial No. 627,438

1 Claim. (Cl. 95—11)

This invention relates to photographic apparatus for ophthalmic photography, especially for photographing the cornea of the eye.

Of the many types of cameras previously made none has been really successful for photographing the cornea of the eye, although a camera which could be used for this purpose has been needed for a long time. Thus, for example, in the study of riboflavin deficiencies it has been known that the extent of corneal vascularization, i. e. the spread of blood vessels in the cornea of the eye, is related to such deficiency. These blood vessels are, however, minute and there has been no way of making an accurate record of them or of changes in their appearance with increasing or decreasing riboflavin deficiency.

Hitherto, the only instrument for examining the cornea has been the slit lamp. This consists of a source of fairly strong steady light formed into a beam of slit form and so directed as to be reflected from the iris out through the cornea in the area to be examined. This area is then viewed under suitable magnification through an appropriate optical instrument. The slit lamp is tiring for the patient's eyes because the examination takes some time and the light must remain on throughout. However, the volume of light which can be used without injury to the eye is not great enough to permit a satisfactory photograph to be taken. Consequently, the only records of the state of the cornea which could hitherto be made were drawings based on observations by the slip lamp. This unsatisfactory situation is shown by the fact that such drawings form the only illustrations of corneal vascularization in a number of recent articles on riboflavin deficiency by Drs. Sydenstrecker, Sebrell, Clerckley and Kruse, who are outstanding investigators in this field; see, for example, Journal of the American Medical Association, vol. 114, pages 2437–2445, June 22, 1940.

The apparatus of the present invention has been designed particularly to provide photographic records of eye conditions and especially of corneal blood vessel conditions.

The apparatus according to the invention for ophthalmic photography comprises a source of light which is adapted upon energization to produce a flash light of intensity equivalent to energy of not less than about 1,000,000 watts and a duration of not more than 1/10000 of a second. Preferably the intensity is equivalent to energy of about 2,000,000 watts and the duration is about 1/15000 of a second or less. Means are provided for energizing and de-energizing this source of light and a pilot light of relatively low intensity is mounted co-axially with this source. The apparatus includes a camera, a support for the head of the person whose eye is to be photographed, means for adjusting this support to bring the eye onto the axis of the camera, and means for focusing the camera on the part of the eye to be photographed. The light source and pilot light are supported for adjustment around the camera axis through substantially a 360° arc and also for adjustment in a plane containing the camera axis and perpendicular to the plane of arcuate adjustment. The pilot light gives the required light for focusing and may be adjusted by the operator in such a way that there is no total reflection along the camera axis from the eye to be photographed. Since the pilot light is mounted co-axially with the light source, the result of such adjustment is that total reflection along the camera axis of the light of the high intensity flash is entirely avoided.

The invention will be described in more detail by reference to the attached drawing which illustrates a form thereof adpated especially for ophthalmic photography.

In the drawings,

Figure 1 is a general side elevation of the camera set up for operation with a subject ready to be photographed, and Figure 2 is a partial perspective view with parts broken away.

The camera used in the apparatus of the invention may be of any suitable type. As shown in Figure 2 it comprises the usual casing 1, extensible bellows 2 and a lens and diaphragm holding casing 3 at the outer end of the bellows. On top of the casing 1 is a focusing hood 4 and at the rear of the casing is a suitable holder 5 for light sensitive material, which in the case illustrated is in the form of a film. The camera is supported from a base 6 in such a way that it may be adjusted transversely to the camera axis through the knob 7, vertically through the knob 8, and longitudinally of such axis through the knob 9, each of these knobs operating appropriate rack and pinion mechanism, and suitable known means being provided for securing the parts in adjusted position.

Opposite the camera is a support 10 for the head of the person whose eye is to be photographed, this support being adjustable longitudinally of the camera axis through the clamping screw 11 and vertically through the knob 12. It is provided with a holder 12a pivoted at 12b, whose angular positions may be adjusted through a knob 12c to ensure that the head of the person to be photographed, whose forehead is pressed against it, will be held vertical. Because of the provision of the adjustable camera support and head support, the position of the eye to be photographed can be adjusted with relation to the camera on the basis of the first subject to be photographed, and succeeding subjects may then be photographed with either no further adjustment or only minor adjustments necessitated by slight differences in relative positions of the eyes in the heads.

Supported for adjustment around the camera axis (indicated by the horizontal broken line in Figure 1) through a full circle, that is, through a 360° arc, and also in a plane perpendicular to that circle and containing the camera axis is a casing 13 containing a high intensity light source diagrammatically indicated in dotted lines at 13c and a co-axially mounted low intensity pilot light diagrammatically indicated in dotted lines at 13d. One type of high intensity light source which has been successfully used in practice is that model of the well-known "Kodak Kodatron" equipment made by the Eastman Kodak Company which absorbs about 2,000,000 watts of energy and has a flash of a duration of about 1/30000 of a second. Light sources giving a flash of a duration of about 1/15000 of a second have also been successfully used in practice. The pilot light 13d may be an ordinary low power bulb. The casing 13 has a forward cylindrical part 13a which encloses both the light source 13c and the pilot light 13d and holds one or more condensing lenses 13b which form beams of the light produced by both the source 13c and the pilot 13d.

The casing 13 is supported from the camera casing 1 by an arm 15, the horizontal branch 15a of which passes through a bracket 14 on the casing 13 and the vertical arm 15b of which passes through a bracket 16. The bracket 14 is slidable and rotatable on the branch 15a of the arm and may be fixed in adjusted position by a thumbscrew 17, while the branch 15b of the arm is slidable and rotatable in the bracket 16 and may be fixed in adjusted position in that bracket by a thumbscrew 18.

The bracket 16 is carried by an extension 19 of a ring 20, which is supported for rotation between two fixed rings 21 and 22, which have square openings corresponding to the dimensions of the casing 1 so that the whole light assembly may be slipped onto the casing where it is secured in position against the block 23 on the casing by a bolt having a knurled knob 23a. The rings 21 and 22 are provided with a pair of registering openings through which a pin carried by a knob 24 may pass. The ring 20 is provided, around its periphery, with a number of registering openings, e. g. four, spaced at angles of 90° from each other. To free the ring for rotation the knob 24 is withdrawn towards the rear of the camera, that is, towards the focusing hood 4, and the ring 20 then rotated until the light source is in the desired position and one of the openings in the ring 20 registers with the pair of openings in the rings 21 and 22. The knob 24 is then released so that the pin passes through all three openings and secures the parts in adjusted position. One such position is indicated in full lines in Figure 1. The angular position 180° removed from it is indicated in dotted lines. More pairs of registering openings could of course be provided in the rings 21 and 22 if desired. The casing 13 is thus universally adjustable with respect to the camera casing 1.

The apparatus may be used to photograph either the whole eye or approximately one quadrant of the eye. In Figure 1 it is assumed that the lower quadrant of the eye is to be photographed. For this purpose the subject rests his head on the support 10 and looks at a spot in the centre of lens 13b, the casing 13 being in this case in its uppermost position as shown in full lines in the drawings. The pilot light is turned on by some appropriate switch not shown and, while the operator looks through the focusing hood 4 onto an appropriate ground glass screen, appropriate adjustments of the camera and support are made to bring the eye of the person to be photographed onto the axis of the camera. The support 10 is then moved toward or away from the camera, and the angle of the casing 13, whose longitudinal axis coincides with the beams from the source 13c in pilot light 13d, is adjusted until total reflection of the light from the pilot light along the camera axis is avoided. The operator can observe when the adjustment is properly made because at that time he will see in the viewing screen no total reflection by the eye to be photographed of the beam from the pilot light. When the adjustment has been completed the photograph is taken by operating the camera shutter mechanism, for example, through a shutter tripping lever 55. This mechanism carries suitable means for energizing the light source as the shutter of the camera opens and de-energizing it as the shutter closes. The interval between energization and de-energization is relatively unimportant with the type of light source referred to above, provided it does not exceed about 10 seconds, because that interval has nothing to do with the duration of the flash from the light source. It is necessary simply that the source be de-energized before it has built up again for another flash. Accordingly many different forms of energization and de-energization means may be satisfactory. The form shown and described in detail in Patent No. 2,441,370, dated May 11, 1948, of which the present application is a continuation in part, is one which has been used successfully in practice.

What I claim is:

Ophthalmic photography apparatus comprising a single source of light adapted upon energization to produce a flash of light of an intensity equivalent to energy of not less than about 1,000,000 watts and a duration of not more than about one ten-thousandth of a second, means for energizing and de-energizing said source, a pilot light of relatively very low intensity mounted co-axially with said source, means for forming beams of the light from said source and from said pilot light, a camera, a support for the head of the person whose eye is to be photographed, means for adjusting said support to bring the eye onto the axis of the camera, means for focusing the camera on the part of the eye to be photographed, and means mounted on the camera for supporting said light source and pilot light for adjustment around the camera axis through substantially a 360° arc and also for adjustment in a plane containing the camera axis and perpendicular to the plane of said arcuate adjustment, whereby the beam from said light source may be so directed at the eye as to avoid total reflection along the camera axis.

HAROLD PEARCE.

(References on following page)

REFERENCES CITED

The following references are of record in the file of this patent:

UNITED STATES PATENTS

| Number | Name | Date |
|---|---|---|
| 1,741,526 | Kuhl | Dec. 31, 1929 |
| 2,006,007 | Zimmer | June 25, 1935 |
| 2,257,331 | Clarke | Sept. 30, 1941 |
| 2,277,697 | Grier | Mar. 31, 1942 |
| 2,314,033 | Curran | Mar. 16, 1943 |
| 2,349,457 | Osterberg et al. | May 23, 1944 |

FOREIGN PATENTS

| Number | Country | Date |
|---|---|---|
| 756,464 | France | Sept. 25, 1933 |
| 522,148 | Great Britain | June 11, 1940 |